United States Patent
Gandhi et al.

(10) Patent No.: US 10,108,657 B2
(45) Date of Patent: Oct. 23, 2018

(54) METHODS, SYSTEMS, AND APPARATUS FOR PROCESSING DATA EVENT STREAMS IN A DATABASE ENVIRONMENT

(71) Applicants: Palaniappan Gandhi, Flossmoor, IL (US); Shubhra Biswas, Oak Park, IL (US)

(72) Inventors: Palaniappan Gandhi, Flossmoor, IL (US); Shubhra Biswas, Oak Park, IL (US)

(73) Assignee: SYBASE, INC., Dublin, CA (US)

( * ) Notice: Subject to any disclaimer, the term of this patent is extended or adjusted under 35 U.S.C. 154(b) by 337 days.

(21) Appl. No.: 14/484,709

(22) Filed: Sep. 12, 2014

(65) Prior Publication Data
US 2016/0078077 A1    Mar. 17, 2016

(51) Int. Cl.
G06F 17/30    (2006.01)
G06F 9/46    (2006.01)

(52) U.S. Cl.
CPC ........ *G06F 17/30371* (2013.01); *G06F 9/466* (2013.01); *G06F 17/30377* (2013.01)

(58) Field of Classification Search
CPC ............... G06F 17/30371; G06F 9/466; G06F 17/30377
See application file for complete search history.

(56) References Cited

U.S. PATENT DOCUMENTS

| | | | |
|---|---|---|---|
| 5,355,484 A * | 10/1994 | Record | G06F 9/542 714/E11.179 |
| 6,591,272 B1 * | 7/2003 | Williams | G06F 17/30607 |
| 9,582,365 B1 * | 2/2017 | Narsude | G06F 17/30569 |
| 2011/0093631 A1 | 4/2011 | Gerea et al. | |
| 2012/0079502 A1 | 3/2012 | Kwan et al. | |
| 2013/0339473 A1 * | 12/2013 | McCaffrey | H04L 47/62 709/216 |

FOREIGN PATENT DOCUMENTS

WO    WO-2013172780 A2    11/2013

OTHER PUBLICATIONS

"European Application Serial No. 15002644.1, Search Report dated Jan. 25, 2016", 9 pgs.

\* cited by examiner

*Primary Examiner* — Apu Mofiz
*Assistant Examiner* — Husam T Samara
(74) *Attorney, Agent, or Firm* — Schwegman Lundberg & Woessner, P.A.

(57) ABSTRACT

Methods, systems, computer program products, and articles of manufacture for processing events are described. An event is obtained and the event is processed to generate data using a first set of one or more operators. The generated data is stored in a first column store with a first row/transaction identifier and the first row/transaction identifier is stored in one or more first processing queues to enable further processing of the event using a second set of one or more operators.

20 Claims, 7 Drawing Sheets

*300*

| | 308 | 312 | 316 | 320 | 324 |
|---|---|---|---|---|---|
| | OPCODE | SYMBOL | PRICE | DATE | AMOUNT |
| | INSERT | ORA | 78.66 | 2014-01-01 | 948 |
| 304 | UPDATE | MSFT | 204.99 | 2014-01-01 | 23000 |

| | 408 | | 408 | | 408 | | 408 |
|---|---|---|---|---|---|---|---|
| | SYMBOL | | PRICE | | DATE | | AMOUNT |
| 404 — 1 | MSFT | 1 | 204.00 | 1 | 2014-01-01 | 1 | 23000 |
| 2 | IBM | 2 | 324.00 | 2 | 2014-01-01 | 2 | 83820 |
| 3 | SAP | 3 | 82.91 | 3 | 2014-01-01 | 3 | 94842 |
| 4 | ORA | 4 | 78.66 | 4 | 2014-01-01 | 4 | 948 |
| 5 | MSFT | 5 | 204.99 | 5 | 2014-01-01 | 5 | 23000 |

[4-INS, 5-UPD]

| |
|---|
| 4-INS, 5-UPD |
| 3-DEL |
| 1-DEL, 4-UPD, 78-UPD, 783-DEL |
| 8883-DEL, 933-UPD |

*FIG. 6*

METHODS, SYSTEMS, AND APPARATUS FOR PROCESSING DATA EVENT STREAMS IN A DATABASE ENVIRONMENT

FIELD

The present disclosure relates, generally, to processing data events. In an example embodiment, the disclosure relates to processing data events using stateless stream operators and state-based window operators.

BACKGROUND

Data events, such as events that trigger changes to a database, may be processed with stateless stream operators and state-based window operators. Each event identifies one or more sets of operators that operate on the data in one or more rows of a database. Conventionally, a first system may be used to process events with stateless stream operators and a second system may process events with state-based operators. Thus, a plurality of systems may need to be implemented and maintained to process events using both stateless stream operators and state-based window operators.

BRIEF DESCRIPTION OF DRAWINGS

The present disclosure is illustrated by way of example and not limitation in the figures of the accompanying drawings, in which like references indicate similar elements and in which:

FIG. 3 shows a representation of an example event, in accordance with an example embodiment;

FIG. 4 shows a representation of an example column store, in accordance with an example embodiment;

FIG. 5 shows a representation of an example row/transaction identifier, in accordance with an example embodiment;

FIG. 6 shows a representation of an example processing queue, in accordance with an example embodiment;

DETAILED DESCRIPTION

The description that follows includes illustrative systems, methods, techniques, instruction sequences, and computing program products that embody example embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for processing events using stateless and state-based operators are disclosed. Each event may identify one or more sets of operators that operate on the data in one or more rows of a database. A thread utilizing stateless operators, such as a stream operator thread utilizing stream operators, and/or a thread utilizing state-based operators, such as a window operator thread utilizing window operators, may process each event. Each thread may be mapped to a different type of column store. For example, a thread may be mapped to a local column store, a global column store, and the like, as described more fully below. The thread may store at least a portion of the data resulting from processing the event in the corresponding column store.

In one example embodiment, a row/transaction identifier may be used to identify the data stored in the column store. The row/transaction identifier may identify the type of operation(s) performed to generate the data and may identify the row(s) in the database that have been impacted by the operation(s). The row/transaction identifier may thus provide access to the data associated with a specific version of one or more corresponding rows in the database following the processing of an event and/or the application of a set of operators to the data.

Figure 1A:
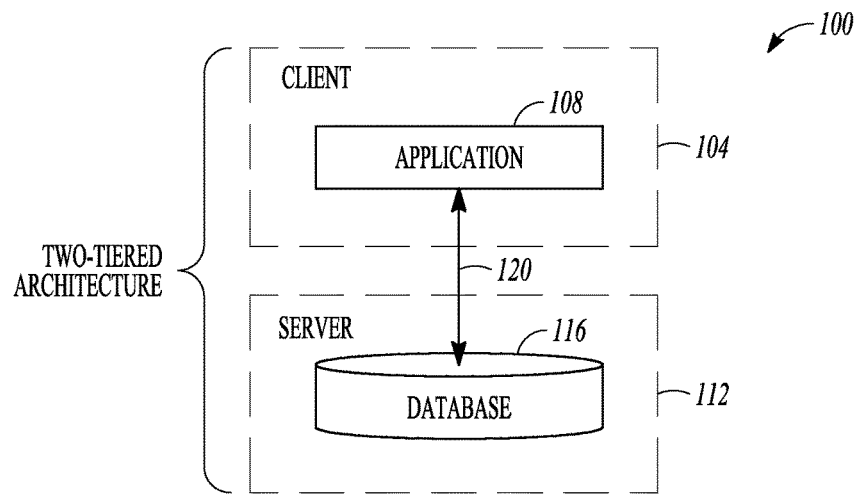
FIGS. 1A and 1B illustrate schematic diagrams of example systems for processing data events using stateless and state-based operators, in accordance with an example embodiment.
Figure 1B:
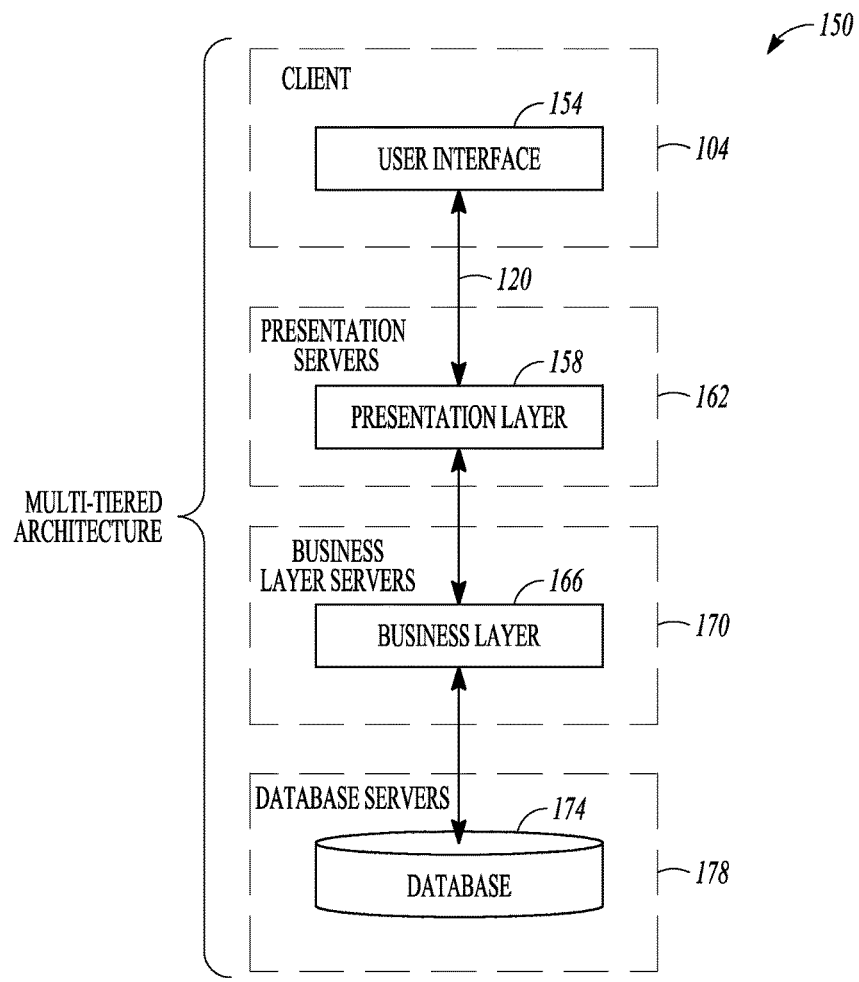

FIGS. 1A and 1B illustrate schematic diagrams of example systems 100, 150 for processing data events using stateless and state-based operators, in accordance with an example embodiment. Stateless operators (known as streams) may operate only on the incoming events and may refer to the state of state-based operators. State-based operators (known as windows) may maintain a state by storing event rows similar to a database table. Events processed by a state-based operator may change the state from its current state by inserting, updating and/or deleting rows of the stored data.

Traditional client-server systems may employ a two-tiered architecture such as that illustrated by system 100 in FIG. 1A. An application 108 executed on a client device 104 of the two-tiered architecture may be comprised of a monolithic set of program code including a graphical user interface component, presentation logic, business logic, and a network interface that enables the client device 104 to communicate over a network 120 with one or more servers 112. A database 116 may be maintained on the server 112 that provides non-volatile or "persistent" storage for the data accessed and/or processed by the application 108.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The database 116 may include data access logic used by the business logic to store and retrieve data.

In response to limitations associated with the two-tiered client-server architecture, a multi-tiered architecture has been developed, as illustrated in FIG. 1B. In the system 150, a presentation layer 158, business layer 166 and database 174 may be logically separated from the user interface 154 of the client device 104. These layers may be moved off of the client device 104 to one or more dedicated servers on the network 120. For example, the presentation layer 158, the business layer 166, and the database 174 may each be maintained on separate servers (e.g., presentation servers 162, business layer servers 170, and database servers 178).

This separation of logical components from the user interface 154 may provide a more flexible and scalable architecture compared to that provided by the two-tiered model of the system 100 in FIG. 1A. For example, the separation may ensure that all clients share a single implementation of the business layer 166. If business rules change, changing the current implementation of the business layer 166 to a new version may not call for updating any client-side program code. In addition, the presentation layer 158 may be provided, which generates code for a variety of different user interfaces 154, which may be standard browsers.

When data in the database 174 is changed, the data access logic of the database 116 may maintain a version of the data before the change and a version of the data after the change. The data access logic of the database 116 may generate a row/transaction identifier that identifies the row(s) of data in the database that were modified and an operation code that identifies the type of operation(s) performed on the row(s) of the database, as described more fully below in conjunction with FIG. 5. Each row/transaction identifier may be used by various threads and applications to access the data associated with a specific version of the corresponding row(s). In one example embodiment, a row/transaction identifier may be used to access the data associated with a specific version of a corresponding row(s) following the processing of an event and/or the application of a set of operators to the data in the database.

Figure 2A:
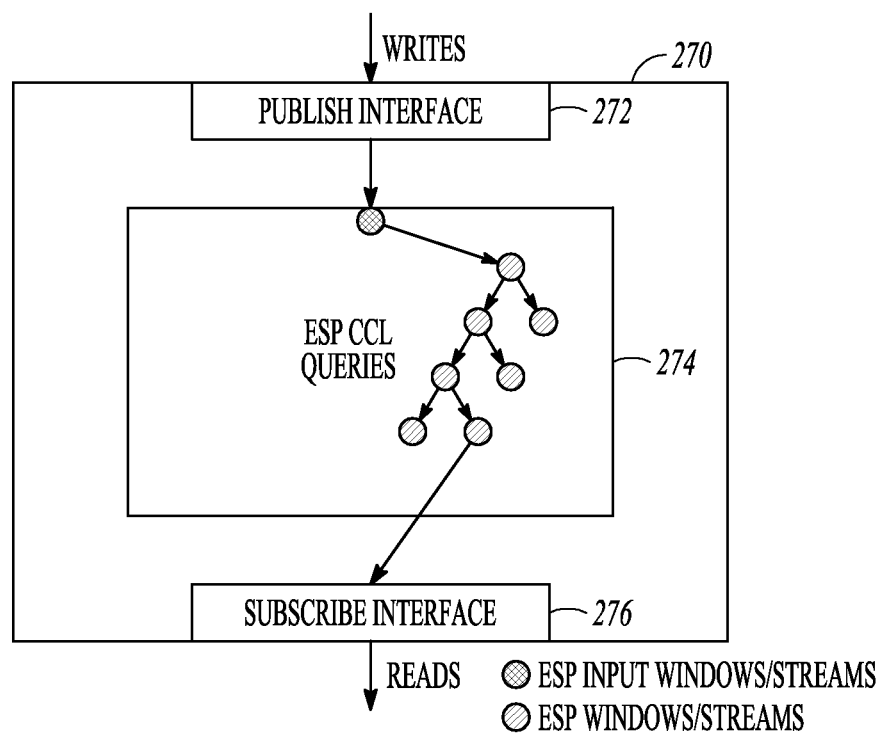
FIG. 2A is a high-level logic diagram of an example system for processing data events using stateless and state-based operators, in accordance with an example embodiment.

FIG. 2A is a high-level logic diagram of an example system 270 for processing data events using stateless and state-based operators, in accordance with an example embodiment. In one example embodiment, events are written via a publish interface 272 to an event stream processing system 274, described more fully below in conjunction with FIG. 2B. The event stream processing system 274 comprises a number of threads wherein each thread is responsible for executing a set of operators on one or more rows of a database. The results of processing by one thread may be used in the processing of one or more downstream threads. The final results of the event processing may be provided via a subscribe interface 276. In one example embodiment, the first thread to receive an event from the publish interface 272 may be an event stream processing (ESP) system input windows/streams thread. The remaining thread(s) may be ESP window operator threads or stream operator threads. In one example embodiment, the event stream processing system 274 may process CCL queries where the queries are written in a declarative language that defines stateless and/or state-based operations on events.

Figure 2B:
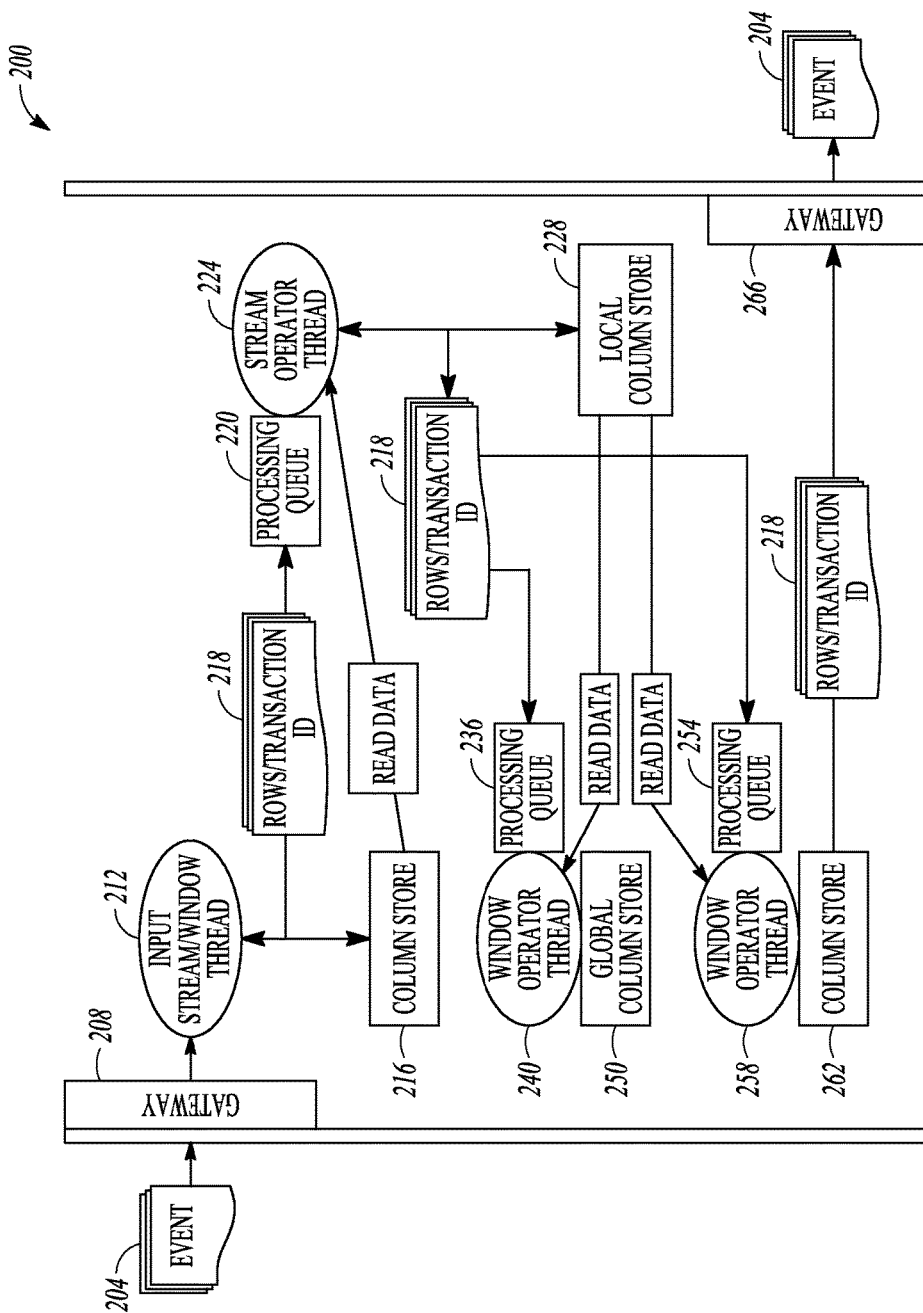
FIG. 2B is a representation of an example workflow for processing data events using stateless and state-based operators, in accordance with an example embodiment.

FIG. 2B is a representation of an example workflow 200 for processing data events using stateless and state-based operators, in accordance with an example embodiment. An event 204 may be, for example, an external event, an internal event resulting from a detected change in a database, a trigger inserted in an event stream, and the like. Each event 204 may comprise a column representing the operation to be performed and a row of data comprising value fields corresponding to the event 204, as described more fully below in conjunction with FIG. 3. In one example embodiment, the stateless operators, such as stream operators, and the state-based operators, such as window operators, may be mapped to different types of column stores for storage of the event processing results.

Each event 204 may be received and/or transmitted by a gateway 208, 266. The gateway 208 may be responsible for receiving the events 204 and the gateway 266 may be responsible for providing the results of event processing to external systems. Each gateway 208, 266 may also reformat the data associated with an event 204 to conform to the protocol of the event stream processing system 274 and may reformat the results of processing the event 204 to conform to the protocol of the external systems, clients, and the like.

In one example embodiment, the arrival of the event 204 may, for example, trigger one or more sets of operators that may operate, for example, on data within the database 174. Operators may include, for example, filters, joins, and the like. As each event 204 arrives and changes data in the database, the database servers 178 may generate a row/transaction identifier 218 that identifies the type of operation that was performed and the row(s) impacted by the modification. The database servers 178 may also maintain a version of the data both prior to and after the modification for at least a limited amount of time. The row/transaction identifier 218 may therefore be used to track changes to the database 174 and to access both the original data and the revised data in the database 174. Each row/transaction identifier 218 may comprise a set of numeric identifiers that identify the cells in a column store 216 that have been impacted by a set of operators, as described more fully below in conjunction with FIG. 5.

To process the event 204, the event 204 may be received via the gateway 208 and processed via an input stream/window thread 212. A set of operators for processing the event 204 may be identified and the set of operators may be executed on the data identified by the event 204. A portion of the data generated during the execution of the set of operators may be stored in a column store 216. The generated data may be stored temporarily in the column store 216. For example, the generated data may be maintained in the column store 216 until all the event processing that utilizes the stored data is complete. In some instances, the generated data may be stored in a column store for a long term. For example, in the case of a global column store, the generated data may be maintained in the global column store even after the event processing that utilizes the stored data is complete and, in some instances, the data may be maintained for as long as the corresponding thread and/or the event stream processing system 274 is active, as described more fully below.

The row/transaction identifier 218 that identifies the type of operation(s) performed and the row(s) of the database that have been impacted by the processing may be stored in a processing queue 220 for further processing by an additional thread(s) that may each execute an additional set of operators. For example, a stream operator thread 224 may access the row/transaction identifier 218 in the processing queue 220 and may execute the next set of operators for the event 204. In one example embodiment, the writing of a row/transaction identifier 218 into the processing queue 220 may trigger the stream operator thread 224 to access the row/transaction identifier 218 and execute the next set of operators. While processing the set of operators, the stream operator thread 224 may access the data stored in the column store 216 by utilizing the row/transaction identifier 218 from the processing queue 220. The data produced by the stream operator thread 224 may be stored in a local column store 228. A local column store, such as the local column store 228, may be maintained for the active life of the corresponding thread, such as the stream operator thread 224. Once the generated data stored in the column store 216 has been accessed by the stream operator thread 224, the accessed data may be deleted from the column store 216. In one example embodiment, the deletion of the cited data from the column store 216 may be performed by management logic associated with the column store 216.

The stream operator thread 224 may store at least a portion of the data generated during the execution of the set of operators in the local column store 228. As described above, a local column store (e.g., the local column store 228) may be instantiated for the life of its corresponding thread (e.g., the stream operator thread 224). The stream operator thread 224 may forward the row/transaction identifier 218 that identifies the type of operation(s) performed and the row(s) of the database that have been impacted by the set of operators to the thread(s) that are next in line for processing the event 204. For example, the stream operator thread 224 may forward the row/transaction identifier 218 to a processing queue 236 and a processing queue 254 for further processing by window operator threads 240, 258, respectively. Each window operator thread 240, 258 may execute another set of operators. The event data in the local column store 228 may only be stored until both window operator threads 240 and 258 have accessed the data stored in the local column store 228.

As described above, the row/transaction identifiers 218 stored in processing queues 236, 254 may be used to access the data in the local column store 228. The processing of the event 204 by window operator threads 240, 258 may be similar to the processing of the event 204 by the stream operator thread 224, except that the former are state-based while the latter are stateless. Once the generated data stored in the local column store 228 has been accessed by both window operator threads 240, 258, the generated data stored in the local column store 228 may be deleted from the local column store 228. This may be automatically accomplished by management logic associated with the local column store 228.

The window operator thread 240 may store the data generated by the associated set of operators in a global column store 250. The generated data stored in the global column store 250 is not necessarily deleted as a result of further processing of the event 204. For example, data stored in the global column store 250 may be maintained for the life of the window operator thread 240 or for the life of the event stream processing system 274. The data stored in the global column store 250 may be visible and/or accessible outside the event stream processing system 274. For example, the data stored in the global column store 250 may be accessible by systems, clients, and the like that are external to the event stream processing system 274.

Similarly, the window operator thread 258 may store the data generated by the associated set of operators in a column store 262. Once again, one or more row/transaction identifiers 218 may identify the data stored in the column store 262 by the window operator thread 258; the one or more row/transaction identifiers 218 may be forwarded to the gateway 266. The gateway 266 may provide the results of the event 204 to systems, clients, and the like that are external to the event stream processing system 274 utilizing the corresponding row/transaction identifier 218. In addition, the gateway 266 may reformat the results of the event 204 to conform to one or more formats and protocols of the external systems, clients, and the like.

FIG. 3 shows a representation of an example event 300, in accordance with an example embodiment. The example event 300 may be the event 204 illustrated in FIG. 2B. In one example embodiment, the event 300 may comprise a row 304 for each operation to be performed and a column 308 representing the operation code (OPCODE) to be performed. In one example embodiment, an operation may be an insert operation, an update operation, a delete operation, and the like. As shown in FIG. 3, the event 300 may comprise a data field comprising a symbol 312, a price 316, a date 320, and an amount 324. One or more of the elements of the data field may be used in the performance of the corresponding operation code represented by the column 308. As illustrated in FIG. 3, the first operation code to be performed is an insert operation and the second operation to be performed is an update operation.

FIG. 4 shows a representation of an example column store 400, in accordance with an example embodiment. The column store 400 may serve as, for example, the local column store 228. In one example embodiment, each column 408 may correspond to a defined type of data; the data for each column 408 may be stored sequentially in the column store 400, as illustrated in FIG. 4. Each row 404 may be given a numeric identifier to uniquely identify the corresponding value cell.

FIG. 5 shows a representation of an example row/transaction identifier 500, in accordance with an example embodiment. The row/transaction identifier 500 may serve as the row/transaction identifier 218. In one example embodiment, the example row/transaction identifier 500 may comprise an alpha-numeric identifier that identifies the type of operation(s) that were performed and a set of one or more numeric identifiers that identify the cells in the column store 400 that have been impacted by the set of operators. Taking the example above, if the two rows in FIG. 3 are applied to the column store 400 in FIG. 4, the set of rows impacted will be [4-INS, 5-UPD] where 4-INS indicates that row 4 is to be inserted and 5-UPD indicates that row 5 is an update to existing row 1. This set of rows forms the example row/transaction identifier 500. In this state, operators that have not yet received the row/transaction identifier 500 will see the column store as comprising rows 1, 2, 3, 4. Operators that have received the row/transaction identifier 500 will see the column store as comprising rows 2, 3, 4, 5.

FIG. 6 shows a representation of an example processing queue 600, in accordance with an example embodiment. In one example embodiment, the processing queue 600 may be a first-in, first-out (FIFO) structure that contains a set of one or more row/transaction identifiers 218, such as the example row/transaction identifier 500 illustrated in FIG. 5. The processing queue 600 may serve as the processing queue 220 of FIG. 2B. A thread, such as the stream operator thread 224, may access the processing queue 600 to obtain the next row/transaction identifier 218 for processing the event 204.

Figure 7:
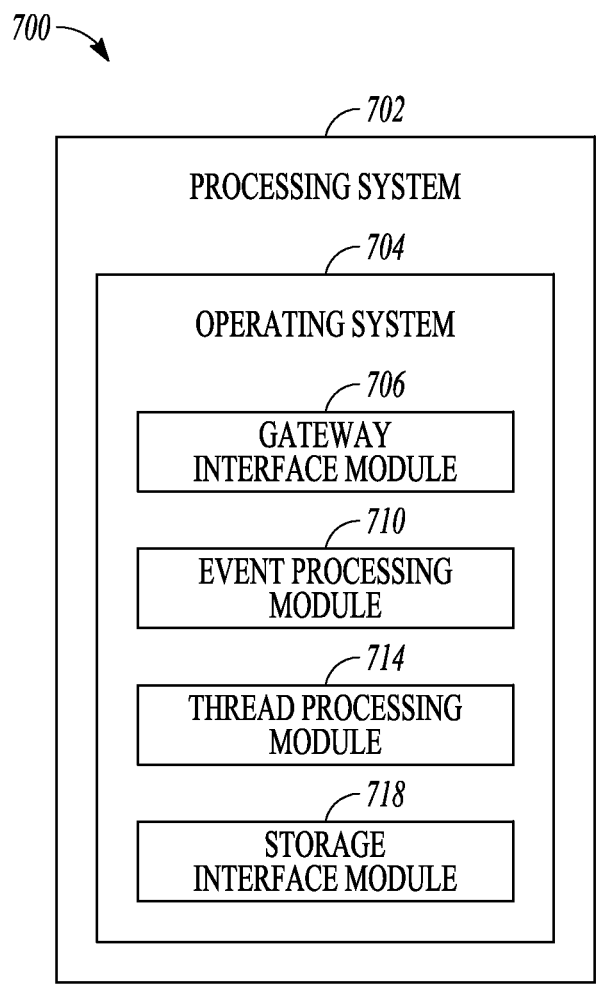
FIG. 7 is a block diagram of an example apparatus for processing data events using stateless and state-based operators, in accordance with an example embodiment.

FIG. 7 is a block diagram of an example apparatus 700 for processing data events using stateless and state-based operators, in accordance with an example embodiment. The apparatus 700 is shown to include a processing system 702 that may be implemented on a server, client, or other processing device that includes an operating system 704 for executing software instructions. In accordance with an example embodiment, the apparatus 700 may include a gateway interface module 706, an event processing module 710, a thread processing module 714, and a storage interface module 718.

The gateway interface module 706 may provide an interface for obtaining an event 204 from and/or providing the event 204 to the event stream processing system 274. The gateway interface module 706 may reformat events 204 that have been received to conform to the formats and protocols of the event stream processing system 274 and may reformat the results of processing the event(s) 204 to conform to the formats and protocols of the external systems, clients, and the like.

The event processing module 710 may manage a variety of threads, such as the stream operator thread 224 and the window operator threads 240, 258. The event processing module 710 may instantiate a thread for executing a set of operators, may deactivate an actively running thread, and may monitor the performance of each thread. For example, the event processing module 710 may monitor the utilization of a thread, the capacity utilization of a processing queue 600 associated with a thread, and the like. The event processing module 710 may interact with the thread processing module 714 to instantiate a new thread and deactivate an active thread.

The thread processing module 714 may execute a thread comprising a set of operators in response to the availability of a row/transaction identifier 218 in the processing queue 220, 236, 254, 600. Each thread may be instantiated, managed, and/or monitored by the event processing module 710.

The storage interface module 718 may provide access to various storage elements, such as the column store 216, the local column store 228, the global column store 250, and the column store 262, as described more fully above in conjunction with FIG. 2B.

Figure 8:
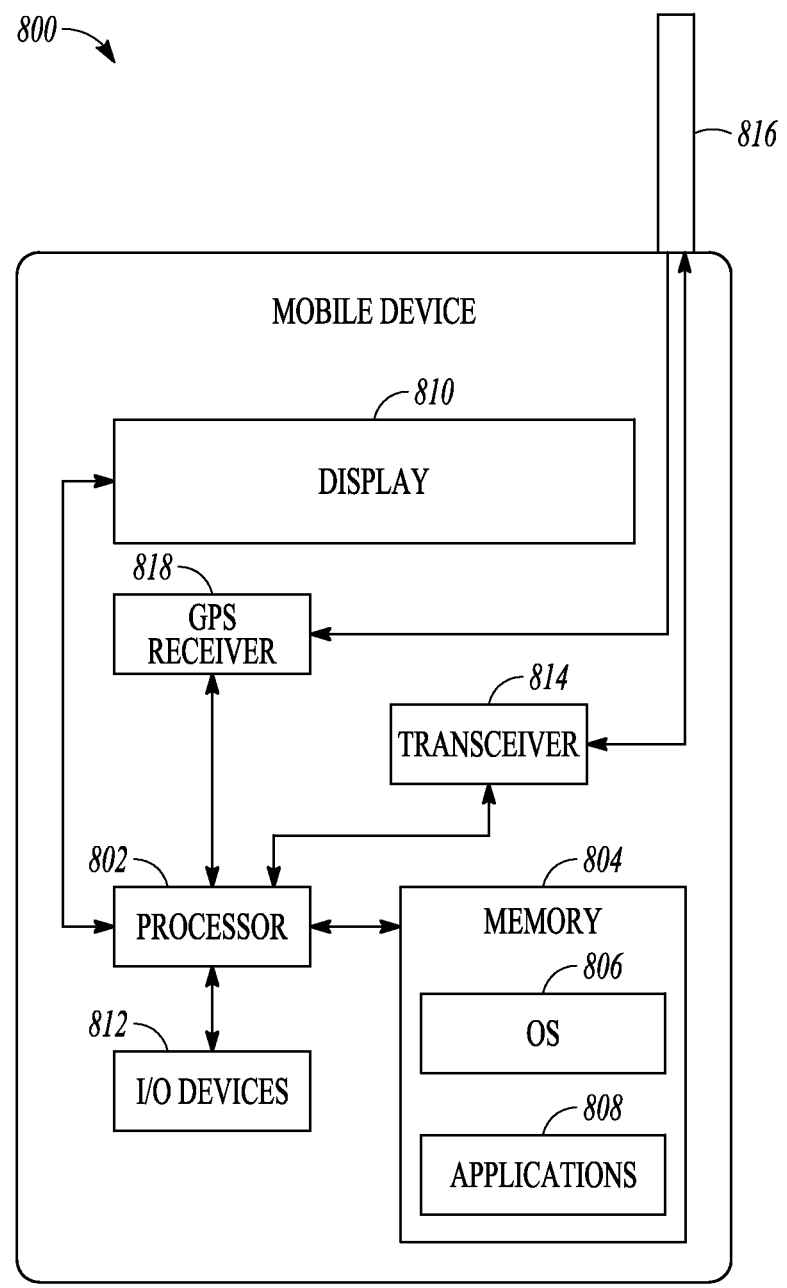
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as applications 808, such as a mobile location enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, and a microphone. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Figure 9:
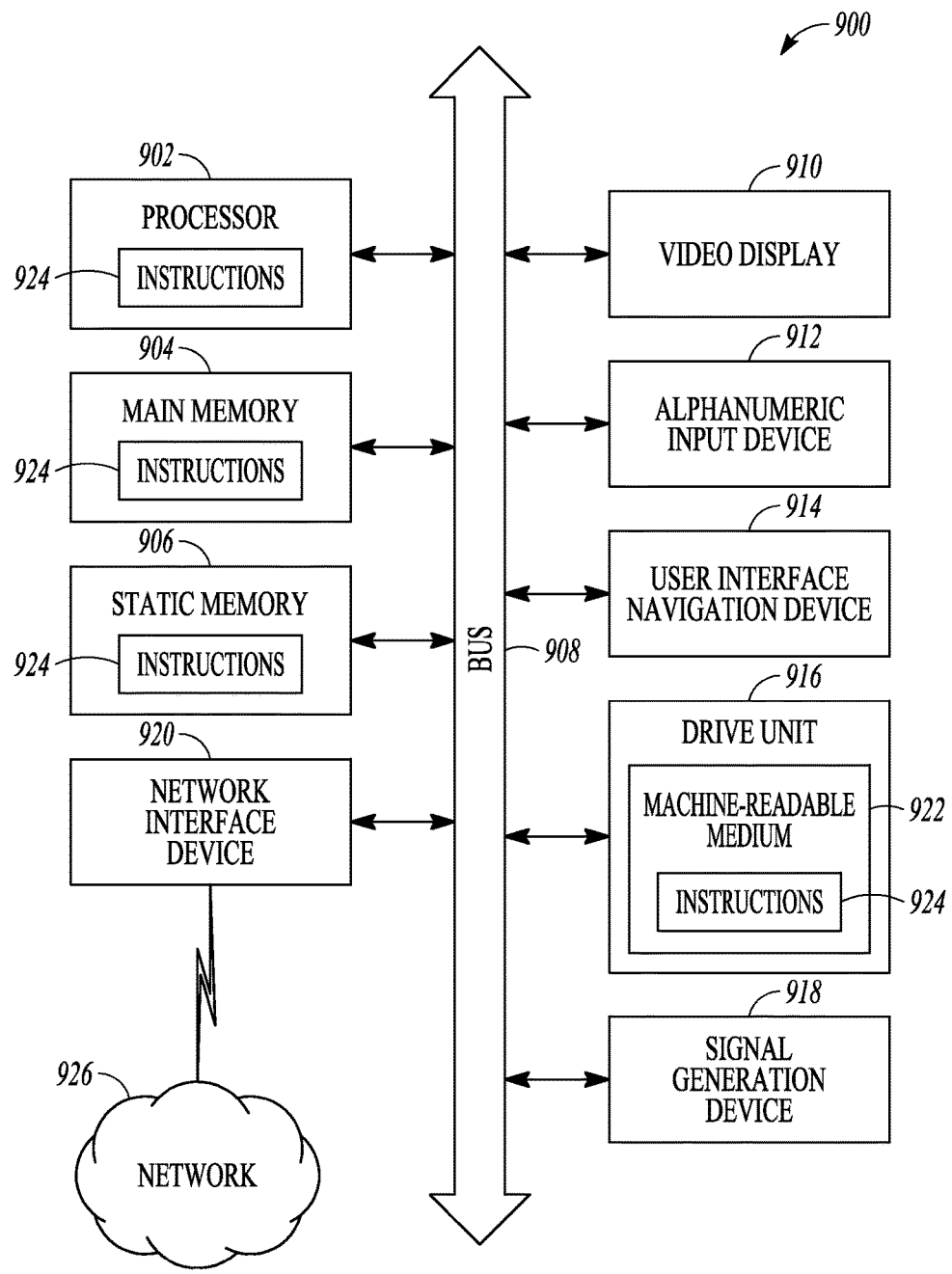
FIG. 9 is a block diagram of a computer processing system within which a set of instructions may be executed for causing the computer to perform any one or more of the methodologies discussed herein.

FIG. 9 is a block diagram of a computer processing system 900 within which a set of instructions may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 900 includes a processor 902 (e.g., a central processing unit (CPU), a graphics processing unit (GPU), or both), a main memory 904, and a static memory 906, which communicate with each other via a bus 908. The computer processing system 900 may further include a video display 910 (e.g., a plasma display, a liquid crystal display (LCD), or a cathode ray tube (CRT)). The computer processing system 900 also includes an alphanumeric input device 912 (e.g., a keyboard), a user interface (UI) navigation device 914 (e.g., a mouse and/or touch screen), a drive unit 916, a signal generation device 918 (e.g., a speaker), and a network interface device 920.

The drive unit 916 includes a machine-readable medium 922 on which is stored one or more sets of instructions 924 and data structures embodying or utilized by any one or more of the methodologies or functions described herein. The instructions 924 may also reside, completely or at least partially, within the main memory 904, the static memory 906, and/or within the processor 902 during execution thereof by the computer processing system 900, the main memory 904, the static memory 906, and the processor 902 also constituting tangible machine-readable media 922.

The instructions 924 may further be transmitted or received over a network 926 via the network interface device 920 utilizing any one of a number of well-known transfer protocols (e.g., Hypertext Transfer Protocol).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions 924 for execution by the computer and that cause the computer to perform any one or more of the methodologies of the present application, or that is capable of storing, encoding, or carrying data structures utilized by or associated with such a set of instructions 924. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of processing an event operating on a database, the method comprising:
    obtaining the event, using at least one hardware processor, the event comprising a first set of one or more operators and a second set one or more operators;
    generating, by a first thread executing at the at least one hardware processor, data by processing the event using the first set of one or more operators;
    storing in the database, the generated data in a first column store with a first identifier, the first identifier identifying one or more types of operators in the first set of one or more operators and identifying one or more rows in the database modified by the first set of one or more operators;
    storing in the database, the first identifier in a first processing queue;
    accessing, by a second thread executing at the at least one hardware processor, the first identifier in the first processing queue; and
    processing the event, by the second thread using the second set of one or more operators.

2. The method of claim 1, further comprising:
    obtaining the first identifier from one of the first processing queues;
    accessing the data in the first column store utilizing the first identifier; and
    processing the data from the first column store utilizing the second set of one or more operators.

3. The method of claim 1, further comprising:
    maintaining a list of one or more threads associated with the data in the first column store corresponding to the first identifier; and
    deleting the data in the first column store corresponding to the first identifier after all threads in the list of the one or more threads have accessed the data in the first column store corresponding to the first identifier.

4. The method of claim 1, further comprising:
    identifying the first set of operators to be performed to process the event; and
    identifying the first thread corresponding to the first set of operators.

5. The method of claim 4, further comprising instantiating the identified first thread.

6. The method of claim 1, wherein the database maintains a version of the data both prior to and after the modifications for at least a limited amount of time and further comprising accessing, in the database, the version of the data prior to modifications and the version of the data after the modifications.

7. The method of claim 1, wherein the storing of the first identifier triggers the second thread to access the identifier in the one or more first processing queues and to perform the processing the event.

8. An apparatus for processing an event, the apparatus comprising an event processing module, implemented using at least one hardware processor, configured to:
    obtain the event, the event comprising a first set of one or more operators and a second set of one or more operators;
    generate, by a first thread, data by processing the event using the first set of one or more operators;
    store, in a database, the generated data in a first column store with a first identifier, the first identifier identifying one or more types of operators in the first set of one or more operators and identifying one or more rows in the database modified by the first set of one or more operators;
    store, in the database, the first identifier in a first processing queue;
    access, by a second thread, the first identifier in the first processing queue; and
    process the event, by the second thread, using the second set of one or more operators.

9. The apparatus of claim 8, the event processing module further configured to:
    obtain the first identifier from one of the first processing queues;
    access the data in the first column store utilizing the first identifier; and
    process the data from the first column store utilizing the second set of one or more operators.

10. The apparatus of claim 8, the event processing module further configured to:
    maintain a list of one or more threads associated with the data in the first column store corresponding to the first identifier; and
    delete the data in the first column store corresponding to the first identifier after all threads in the list of the one or more threads have accessed the data in the first column store corresponding to the first identifier.

11. The apparatus of claim 8, the event processing module further configured to:
    identify the first set of operators to be performed to process the event; and
    identify the first thread corresponding to the first set of operators.

12. The apparatus of claim 11, the event processing module further configured to instantiate the identified first thread.

13. The apparatus of claim 8, wherein the database maintains a version of the data both prior to and after the modifications for at least a limited amount of time and the operations further comprising accessing, in the database, the version of the data prior to modifications and the version of the data after the modifications.

14. The apparatus of claim 8, wherein the storing of the first identifier triggers the second thread to access the identifier in the one or more first processing queues and to perform the processing the event.

15. A non-transitory machine-readable storage medium comprising instructions that, when executed by one or more processors of a machine, cause the machine to perform operations comprising:
    obtaining an event, using at least one hardware processor, the event comprising a first set of one or more operators and a second set of one or more operators;
    generating, by a first thread, data by processing the event using the first set of one or more operators;
    storing, in a database, the generated data in a first column store with a first identifier, the first identifier identifying one or more types of operators in the first set of one or more operators and identifying one or more rows in the database modified by the first set of one or more operators;

storing, in the database, the first identifier in a first processing queue;

accessing, by a second thread executing at the at least one hardware processor, the first identifier in the first processing queue; and processing the event, by the second thread using the second set of one or more operators.

16. The non-transitory machine-readable storage medium of claim 15, further comprising instructions that cause the machine to perform operations comprising:

obtaining the first identifier from one of the first processing queues;

accessing the data in the first column store utilizing the first identifier; and processing the data from the first column store utilizing the second set of one or more operators.

17. The non-transitory machine-readable storage medium of claim 15, further comprising instructions that cause the machine to perform operations comprising:

maintaining a list of one or more threads associated with the data in the first column store corresponding to the first identifier; and deleting the data in the first column store corresponding to the first identifier after all threads in the list of the one or more threads have accessed the data in the first column store corresponding to the first identifier.

18. The non-transitory machine-readable storage medium of claim 15, further comprising instructions that cause the machine to perform operations comprising:

identifying the first set of operators to he performed to process the event; and identifying the first thread corresponding to the first set of operators.

19. The non-transitory machine-readable storage medium of claim 18, further comprising instructions that cause the machine to perform operations comprising instantiating the identified first thread.

20. The non-transitory machine-readable storage medium of claim 15, wherein the database maintains a version of the data both prior to and after the modifications for at least a limited amount of time and further comprising accessing in the database the version of the data prior to modifications and the version of the data after the modifications.

* * * * *